(12) United States Patent
Nagayo et al.

(10) Patent No.: US 10,851,706 B2
(45) Date of Patent: Dec. 1, 2020

(54) VARIABLE NOZZLE MECHANISM AND VARIABLE DISPLACEMENT TYPE EXHAUST TURBOCHARGER

(71) Applicant: MITSUBISHI HEAVY INDUSTRIES ENGINE & TURBOCHARGER, LTD., Sagamihara (JP)

(72) Inventors: Yukihide Nagayo, Tokyo (JP); Yuki Ishii, Tokyo (JP); Takaki Sato, Tokyo (JP); Yosuke Dammoto, Tokyo (JP); Youji Akiyama, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 205 days.

(21) Appl. No.: 15/546,139

(22) PCT Filed: Feb. 24, 2015

(86) PCT No.: PCT/JP2015/055196
§ 371 (c)(1),
(2) Date: Jul. 25, 2017

(87) PCT Pub. No.: WO2016/135846
PCT Pub. Date: Sep. 1, 2016

(65) Prior Publication Data
US 2018/0340467 A1     Nov. 29, 2018

(51) Int. Cl.
*F02B 37/24*     (2006.01)
*F01D 17/16*     (2006.01)
*F01D 25/04*     (2006.01)

(52) U.S. Cl.
CPC ............ *F02B 37/24* (2013.01); *F01D 17/165* (2013.01); *F01D 25/04* (2013.01);
(Continued)

(58) Field of Classification Search
CPC .......... F02B 37/24; F01D 9/045; F01D 17/16; F01D 17/165; F05D 2240/128; F05D 2260/961
See application file for complete search history.

(56) References Cited

U.S. PATENT DOCUMENTS 6,471,470 B2 * 10/2002 Yoshimura ............ F01D 17/165
                                                                                                       415/160
6,623,240 B2 * 9/2003 Ertl ....................... F01D 17/165
                                                                                                       415/163
(Continued)

FOREIGN PATENT DOCUMENTS

CN       1372069 A      10/2002
CN     101405479 A      4/2009
(Continued)

OTHER PUBLICATIONS

Roth, R. Manufacturing Costs of Auto Bodies.Massachusetts Institute of Technology, Cambridge, Massachusetts, USA Available online Jan. 1, 2003. https://doi.org/10.1016/B0-08-043152-6/00897-4 (Year: 2003).*

(Continued)

*Primary Examiner* — Michael Lebentritt
*Assistant Examiner* — Topaz L. Elliott
(74) *Attorney, Agent, or Firm* — Birch, Stewart, Kolasch & Birch, LLP

(57) ABSTRACT

A variable nozzle mechanism includes: a nozzle mount having an annular shape; a plurality of nozzle vanes supported rotatably at a plurality of respective locations along a circumferential direction of the nozzle mount; and a drive ring disposed rotatably with respect to the nozzle mount, the drive ring being configured to transmit a driving force to the nozzle vanes so that a vane angle of the nozzle vanes is variable and to rotate the nozzle vanes. The drive ring includes: a low-rigidity region; and a high-rigidity region
(Continued)

including an uneven portion in a thickness direction of the drive ring, and having a greater cross-sectional secondary moment than the low-rigidity region in a cross section along a radial direction of the drive ring. The low-rigidity region and the high-rigidity region are disposed alternately in the circumferential direction. The number of the low-rigidity region and the number of the high-rigidity region are odd numbers, or the low-rigidity region and the high-rigidity region are disposed at an irregular pitch in the circumferential direction.

3 Claims, 10 Drawing Sheets

(52) U.S. Cl.
CPC .... *F05D 2220/40* (2013.01); *F05D 2240/128* (2013.01); *F05D 2250/182* (2013.01); *F05D 2250/183* (2013.01); *F05D 2250/184* (2013.01); *F05D 2250/73* (2013.01); *F05D 2260/961* (2013.01)

(56) References Cited

U.S. PATENT DOCUMENTS

| | | | | |
|---|---|---|---|---|
| 7,406,826 B2* | 8/2008 | Hayashi | ............... | F01D 17/165 60/602 |
| 7,886,536 B2* | 2/2011 | Hemer | ................. | F01D 17/165 415/159 |
| 8,348,601 B2* | 1/2013 | Hayashi | ............... | F01D 17/165 415/160 |
| 8,480,356 B2* | 7/2013 | Takahiro | .............. | F01D 17/165 415/159 |
| 8,747,058 B2* | 6/2014 | Prang | .................... | F01D 17/165 415/160 |
| 8,967,956 B2* | 3/2015 | Arnold | ................... | F01D 17/16 415/158 |
| 9,017,017 B2* | 4/2015 | Sausse | ................. | F01D 17/165 415/160 |
| 9,695,706 B2* | 7/2017 | Uesugi | ................. | F01D 17/165 |
| 9,784,178 B2 | 10/2017 | Tashiro et al. | | |
| 9,903,220 B2* | 2/2018 | Mayernick | ........... | F01D 17/165 |
| 9,932,851 B2* | 4/2018 | Dougherty | ............. | F01D 9/041 |
| 2002/0098081 A1 | 7/2002 | Ertl et al. | | |
| 2007/0068155 A1 | 3/2007 | Hayashi et al. | | |
| 2010/0202874 A1 | 8/2010 | Hayashi et al. | | |
| 2010/0260597 A1* | 10/2010 | Sausse | ................. | F01D 17/165 415/160 |
| 2011/0182717 A1 | 7/2011 | Tries et al. | | |
| 2012/0315164 A1* | 12/2012 | Mayernick | ........... | F01D 17/165 417/406 |
| 2013/0078082 A1* | 3/2013 | Arnold | ................... | F01D 17/16 415/159 |
| 2014/0161595 A1 | 6/2014 | Tashiro et al. | | |
| 2014/0341719 A1* | 11/2014 | Uesugi | ................. | F01D 17/165 415/159 |
| 2015/0016968 A1 | 1/2015 | Grabowska et al. | | |

FOREIGN PATENT DOCUMENTS

| | | | |
|---|---|---|---|
| CN | 101796279 A | 8/2010 | |
| CN | 202810969 U | 3/2013 | |
| CN | 103649492 A | 3/2014 | |
| EP | 2 180 159 A1 | 4/2010 | |
| EP | 2 871 328 A | 5/2015 | |
| JP | 2007-56791 A | 3/2007 | |
| JP | 2009-531587 A | 9/2009 | |
| JP | 2012-140894 A | 4/2010 | |
| JP | 2010-156279 A | 7/2010 | |
| JP | 2011-127576 A | 6/2011 | |
| JP | 4741709 B1 | 8/2011 | |
| JP | 4875602 B2 | 2/2012 | |
| JP | 2015-94266 A | 5/2015 | |
| KR | 101031633 B1 * | 4/2011 | ........... F01D 17/165 |
| WO | WO 2013/047154 A | 4/2013 | |

OTHER PUBLICATIONS

Hedrick, A.Sheet Metal Stamping 101, Part I. Apr. 14, 2009. available from https://www.thefabricator.com/stampingjournal/article/stamping/sheet-metal-stamping-101-part-i (Year: 2009).*

Office Action effective Feb. 23, 2018 issued to the corresponding Japanese Application No. 2017-501594 with an English Translation.

Extended European Search Report dated Feb. 7, 2018 issued No. 15883144.6 in the corresponding EP Application No. 15883144.6.

Office Action effective Dec. 21. 2018 issued in the corresponding Chinese Application No. 201580073058.1

International Preliminary Report on Patentability dated Sep. 8, 2017 in corresponding International (PCT) Application No. PCT/JP2015/055196.

International Search Report of PCT/JP2015/055196 dated May 25, 2016.

Office Action effective Jun. 21. 2018 issued in the corresponding European Patent Application No. 15 883 144.6.

Chinese Office Action for Chinese Application No. 201580073058.1, dated Feb. 6, 2020, with English translation.

Chinese Office Action and Search Report for Chinese Application No. 201580073058.1, dated Aug. 8, 2019, with partial English translation.

* cited by examiner

RADIAL DIRECTION
INSIDE ←——→ OUTSIDE

ARROW B VIEW

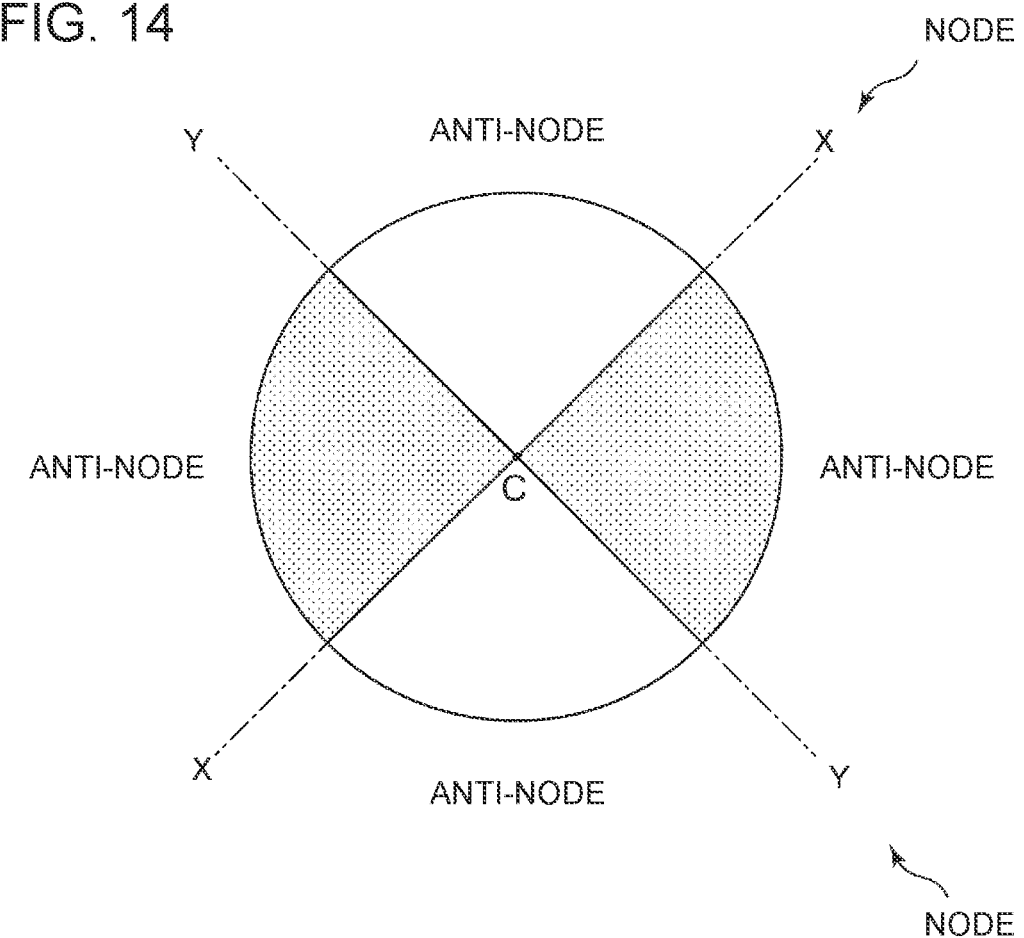

VARIABLE NOZZLE MECHANISM AND VARIABLE DISPLACEMENT TYPE EXHAUST TURBOCHARGER

TECHNICAL FIELD

The present disclosure relates to a variable nozzle mechanism and a variable-displacement type exhaust turbocharger whereby it is possible to suppress occurrence of oscillation.

BACKGROUND ART

A known variable-displacement type exhaust turbocharger is provided with a variable nozzle mechanism which changes the vane angle of a plurality of nozzle vanes and thereby controls a boost pressure.

Such a variable-displacement type exhaust turbocharger includes a plurality of nozzle vanes disposed rotatably on a nozzle mount fixed to a turbine casing, and a drive ring disposed rotatably on the nozzle mount. Furthermore, the plurality of nozzle vanes are rotated by a drive ring to change the vane angle of the nozzle vanes (see Patent Document 1, for instance).

The drive ring is rotatable and thus not fixed to the nozzle mount, and clearance is formed between the drive ring and the nozzle mount. The drive ring can move freely in the range of the clearance, and thereby the drive ring may develop collision oscillation when oscillation of the internal combustion engine is transmitted to the variable nozzle mechanism. If an excessive stress is generated in the drive ring by the collision oscillation, the drive ring may break apart.

Patent Document 2 discloses a unit for suppressing development of an excessive stress in a drive ring. This unit includes a support pin fixed to the nozzle mount to nip the drive ring from both sides with the nozzle mount to restrict the motion of the drive ring, the support pin being disposed on a node of the natural oscillation in the primary vibration mode described below in the circumferential direction of the drive ring, thereby suppressing excitation of natural oscillation of the drive ring.

CITATION LIST

Patent Literature

Patent Document 1: JP2007-056791A
Patent Document 2: JP2010-156279A

SUMMARY

Problems to be Solved

Patent Document 1 does not disclose a unit for suppressing generation of stress due to the collision oscillation.

The oscillation control unit disclosed in Patent Document 2 requires the support pin to be disposed at a node of natural oscillation in the primary oscillation mode in the circumferential direction of the drive ring, and thus the effect to suppress oscillation may decrease if the support pin becomes displaced from the position of the node. Thus, it is necessary to accurately determine the position where the node is formed.

In view of the problem of the above typical arts, an object of at least one embodiment of the present invention is to enable suppression of oscillation of the drive ring regardless of the positional relationship between the support pin and the node formed in the primary oscillation mode.

Solution to the Problems (1) A variable nozzle mechanism according to at least one embodiment of the present invention comprises: a nozzle mount having an annular shape; a plurality of nozzle vanes supported rotatably at a plurality of respective locations along a circumferential direction of the nozzle mount; and a drive ring disposed rotatably with respect to the nozzle mount, the drive ring being configured to transmit a driving force to the nozzle vanes so that a vane angle of the nozzle vanes is variable and to rotate the nozzle vanes. The drive ring includes: a low-rigidity region; and a high-rigidity region including an uneven portion in a thickness direction of the drive ring, and having a greater cross-sectional secondary moment than the low-rigidity region in a cross section along a radial direction of the drive ring. The low-rigidity region and the high-rigidity region are disposed alternately in the circumferential direction. The number of the low-rigidity region and the number of the high-rigidity region are odd numbers, or the low-rigidity region and the high-rigidity region are disposed at an irregular pitch in the circumferential direction.

A drive ring has an annular shape and a substantially symmetric structure, and natural oscillation in the primary oscillation mode is likely to be excited due to oscillation transmitted from an internal combustion engine. The primary oscillation mode is an oscillation mode generated by the minimum natural frequency. Specifically, as depicted in FIG. 14, in a structural member having a disc shape or an annular shape, the primary oscillation mode is a mode that has nodes in the radial direction X-X and in the direction Y-Y perpendicular to the direction X-X. The sections interposed between X-X and Y-Y are anti-nodes having a great amplitude. The phase of oscillation is opposite in the shaded sections and the blank sections.

FIG. 15 is a schematic diagram of natural oscillation in the primary oscillation mode shown on the drive ring 100. In the drawing, four anti-nodes 100b with a greater amplitude are formed between four regions where the nodes 100a are formed. Adjacent anti-nodes 100b have opposite phases of oscillation.

With the above configuration (1), an odd number of high-rigidity regions having the above uneven portion and low-rigidity regions are provided in the circumferential direction of the drive ring, or high-rigidity regions having the uneven portion and low-rigidity regions are provided at an irregular pitch, and thereby it is possible to suppress excitation of natural oscillation in the primary oscillation mode in which an even number of nodes and anti-nodes are formed at a regular interval. Accordingly, it is possible to suppress generation of stress and to prevent damage to the drive ring. Further, the high-rigidity regions having a large cross-sectional secondary moment are formed and the rigidity of the drive ring is enhanced as a whole, and thus it is possible to further suppress generation of natural oscillation.

Further, it is possible to suppress generation of stress without taking into consideration the positional relationship between the support pins and the nodes formed in the primary oscillation mode. Furthermore, it is possible to suppress generation of stress, and thereby it is possible to reduce the thickness of the drive ring and to reduce the costs.

(2) In some embodiments, in the above configuration (1), at least the high-rigidity region of the drive ring includes a rib extending along the circumferential direction at an inner peripheral side or an outer peripheral side of the drive ring, and the rib forms the uneven portion.

With the above configuration (2), the high-rigidity region is formed by the rib, and thus it is possible to form the high-rigidity region by simple and low-cost machining.

(3) In some embodiments, in the above configuration (1) or (2), the variable nozzle mechanism further comprises a support pin fixed to the nozzle mount, the support pin supporting the drive ring rotatably on the nozzle mount. The support pin includes: a support column portion extending along a center axis of the drive ring from the nozzle mount toward the drive ring; and a flange portion disposed on a tip side of the support column portion. The drive ring is disposed so that the uneven portion is nipped between the flange portion and the nozzle mount.

With the above configuration (3), the uneven portion is disposed between the flange portion of the support pin and the nozzle mount, and thereby it is possible to reduce clearance between the uneven portion and the flange portion or the nozzle mount. Accordingly, it is possible to reduce collision oscillation that occurs at the uneven portion, and to suppress generation of stress at the uneven portion.

(4) In some embodiments, in any one of the above configurations (1) to (3), the drive ring includes the uneven portion disposed selectively in the high-rigidity region.

With the above configuration (4), with the uneven portion disposed in the high-rigidity region, it is possible to increase the cross-sectional secondary moment of the high-rigidity region effectively.

(5) In some embodiments, in any one of the above configurations (1) to (3), the uneven portion is disposed over an entire periphery of the drive ring, and the low-rigidity region of the drive ring has a smaller width in the radial direction than the high-rigidity region.

With the above configuration (5), it is possible to form the low-rigidity region easily by simple and low-cost machining.

(6) In some embodiments, in the above configuration (5), an undercut is formed in the low-rigidity region of the drive ring.

With the above configuration (6), it is possible to form the low-rigidity region easily by simple and low-cost machining. Furthermore, with the undercut, it is possible to facilitate formation of the uneven portion (e.g. the rib).

(7) A variable nozzle mechanism according to at least one embodiment of the present invention comprises: a nozzle mount having an annular shape; a plurality of nozzle vanes supported rotatably at a plurality of respective locations along a circumferential direction of the nozzle mount; and a drive ring disposed rotatably with respect to the nozzle mount, the drive ring being configured to transmit a driving force to the nozzle vanes so that a vane angle of the nozzle vanes is variable and to rotate the nozzle vanes. The drive ring includes: bottom portions disposed at a distance from one another in the circumferential direction; and a plurality of top portions disposed between the bottom portions being adjacent in the circumferential direction, the top portions having a greater distance from the nozzle mount than the bottom portions in a direction along a center axis of the drive ring. The bottom portions and the top portions are arranged alternately in the circumferential direction.

With the above configuration (7), the bottom portions and the top portions are disposed alternately in the circumferential direction, and thus the drive ring can have a high rigidity in the circumferential direction as a whole. Thus, it is possible to suppress excitation of natural oscillation in the primary oscillation mode, and to suppress generation of stress, which makes it possible to prevent damage to the drive ring.

Further, it is possible to suppress generation of stress without taking into consideration the positional relationship between the support pins and the nodes formed in the primary oscillation mode. Furthermore, it is possible to suppress generation of stress, and thereby it is possible to reduce the thickness of the drive ring and to reduce the costs.

(8) In some embodiments, in the above configuration (7), a stepped portion is formed between the bottom portions and the top portions. The stepped portion comprises an odd number of stepped portions formed in the circumferential direction, or stepped portions disposed at an irregular pitch in the circumferential direction.

With the above configuration (8), an odd number of stepped portions are provided in the circumferential direction of the drive ring, or the stepped portions are provided at an irregular pitch in the circumferential direction, and thereby it is possible to suppress excitation of natural oscillation in the primary oscillation mode in which an even number of nodes and anti-nodes are formed, thus suppressing generation of stress.

(9) In some embodiments, in the above configuration (7) or (8), the variable nozzle mechanism further comprises a support pin fixed to the nozzle mount, the support pin supporting the drive ring rotatably on the nozzle mount. The support pin includes: a support column portion extending along a center axis of the drive ring from the nozzle mount toward the drive ring; and a flange portion disposed on a tip side of the support column portion. The drive ring is disposed so that the top portions are disposed between the flange portion and the nozzle mount so as to be adjacent to the flange portion.

With the above configuration (9), the top portions are disposed between the flange portion and the nozzle mount so as to be adjacent to the flange portion, and thus it is possible to reduce clearance between the top portions and the support pin, whereby it is possible to suppress stress that occurs at the top portions due to collision oscillation between the top portions and the support pin.

(10) In some embodiments, in the above configuration (7), the bottom portions and the top portions are disposed alternately so as to form a wavy shape in the circumferential direction.

With the above configuration (10), it is possible to form the high-rigidity region easily by simple and low-cost machining.

(11) A variable-geometry type exhaust turbocharger according to at least one embodiment of the present invention comprises: a turbine part configured to be driven by exhaust gas introduced from an internal combustion engine; a compressor part configured to compress and send external air to the internal combustion engine along with the turbine part; and the variable nozzle mechanism according to any one of the above (1) to (10), disposed in a turbine housing into which the exhaust gas is introduced at the turbine part.

With the above configuration (11), it is possible to suppress oscillation of the drive ring constituting a variable nozzle mechanism, thereby suppressing generation of stress, which makes it possible to prevent damage to the drive ring.

Further, it is possible to suppress generation of stress without taking into consideration the positional relationship between the support pin and the nodes formed in the primary oscillation mode. Furthermore, it is possible to suppress generation of stress, and thereby it is possible to reduce the thickness of the drive ring and to reduce the costs.

Advantageous Effects

According to at least one embodiment of the present invention, it is possible to suppress oscillation of the drive ring constituting a variable nozzle mechanism, thereby suppressing generation of stress, which makes it possible to prevent damage to the drive ring. Further, it is possible to suppress generation of stress without taking into consideration the positional relationship between the support pin and the nodes formed in the primary oscillation mode. Furthermore, it is possible to suppress generation of stress, and thereby it is possible to reduce the thickness of the drive ring and to reduce the costs.

BRIEF DESCRIPTION OF DRAWINGS

FIG. 14 is an explanatory diagram of the primary oscillation mode.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
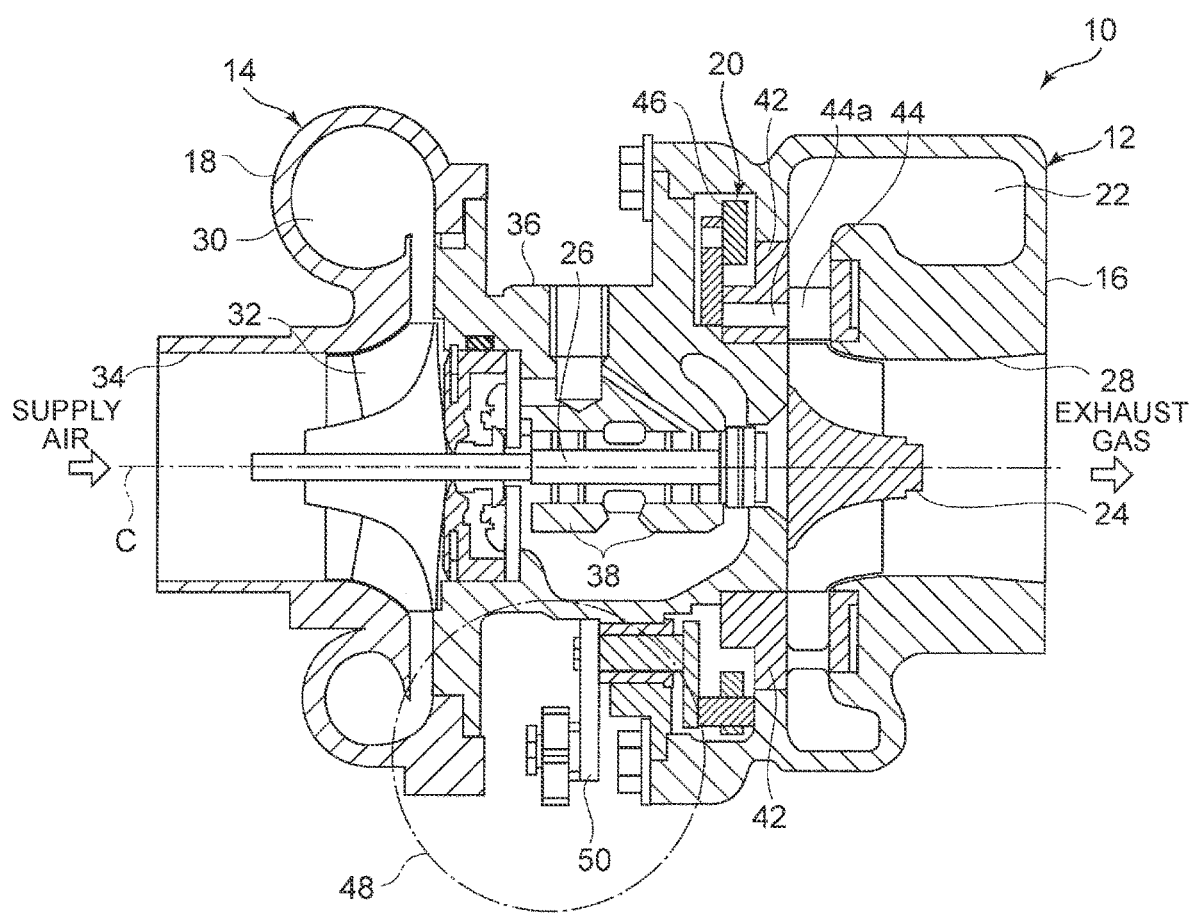
FIG. 1 is a front cross-sectional view of a variable-displacement type exhaust turbocharger according to an embodiment.

As depicted in FIG. 1, a variable-displacement type exhaust turbocharger 10 according to at least one embodiment of the present invention includes: a turbine part 12 driven by exhaust gas introduced from an internal combustion engine (not depicted), a compressor part 14 which compresses external air and sends the air to the internal combustion engine along with the turbine part 12, and a variable nozzle mechanism 20 provided for a turbine housing 16 into which exhaust gas is introduced at the turbine part 12.

A scroll 22 formed to have a spiral shape on the outer peripheral part is disposed on the turbine housing 16. The scroll 22 is in communication with an exhaust port (not depicted) of the internal combustion engine. The turbine rotor 24 is disposed at the center of the scroll 22. The turbine rotor 24 is fixed to an end of the turbine shaft 26, and is rotatable about the axial center C of the turbine shaft 26 along with the turbine shaft 26. An exhaust-gas outlet 28 is disposed at the center of the turbine housing 16, having an opening in a direction along the axial center C and being connected to an exhaust pipe (not depicted).

The compressor part 14 includes a compressor housing 18, and the compressor housing 18 has a supply passage 30 of a spiral shape disposed on the outer peripheral part of the compressor housing 18. The supply passage 30 is in communication with an exhaust port (not depicted) of the internal combustion engine. A compressor 32 is disposed at the center portion of the supply passage 30, and the compressor 32 is fixed to the other end of the turbine shaft 26, and is rotatable about the axial center C of the turbine shaft 26 along with the turbine shaft 26. A supply-air inlet 34 is disposed at the center of the compressor housing 18, having an opening in a direction along the axial center C and being connected to a supply pipe (not depicted).

A bearing housing 36 is disposed between the turbine part 12 and the compressor part 14, and the turbine shaft 26 is supported rotatably by a bearing 38 disposed inside the bearing housing 36.

Figure 2:
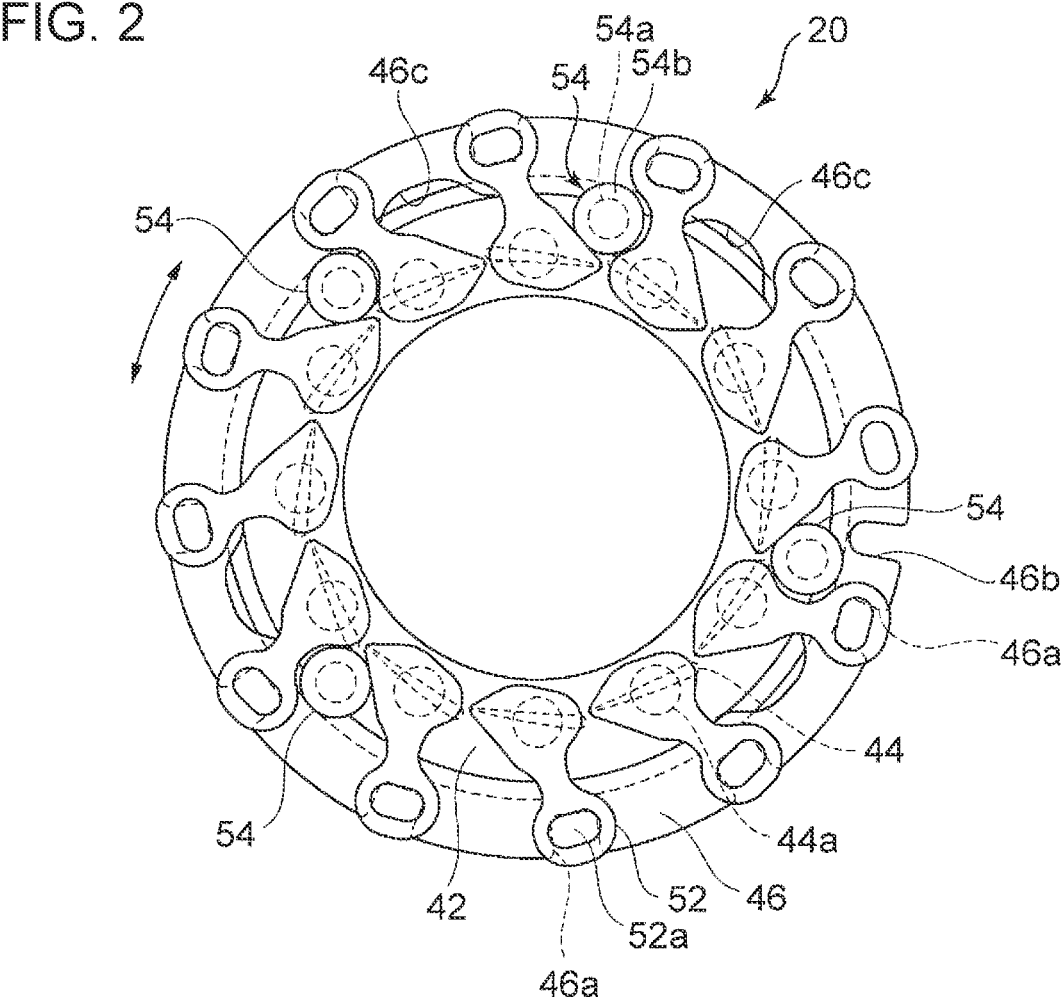
FIG. 2 is a front view of a variable nozzle mechanism according to an embodiment.

As depicted in FIGS. 1 and 2, the variable nozzle mechanism 20 according to some embodiments includes: a nozzle mount 42 of an annular shape; a plurality of nozzle vanes 44 supported rotatably at respective positions along the circumferential direction of the nozzle mount 42; and a drive ring 46 configured to rotate the plurality of nozzle vanes 44. The drive ring 46 is disposed to be rotatable with respect to the nozzle mount 42. The drive ring 46 is capable of applying a driving force to the nozzle vanes 44 and changing the vane angle of the nozzle vanes 44.

The nozzle mount 42 is fixed to the turbine housing 16 with the bearing housing 36 so that the center of the annular shape coincides with the axial center C, inside the turbine housing 16.

The nozzle vanes 44 are disposed on the side of the turbine part 12 of the nozzle mount 42 and inside the scroll 22. The nozzle vanes 44 have nozzle shafts 44a formed integrally and inserted into through holes formed on the nozzle mount 42, and thereby the nozzle vanes 44 are supported rotatably about the nozzle shafts 44a.

The drive ring 46 is formed into an annular shape, and is fixed to the nozzle mount 42 on the side of the bearing housing 36 of the nozzle mount 42 so that the center of the annular shape coincides with the axial center C.

In the embodiment depicted in FIG. 1, the drive ring 46 is connected via a link 50 to an operation part of an actuator 48 fixed to the compressor housing 18.

Further, a lever plate 52 is provided for the side of the bearing housing 36 of the drive ring 46. A plurality of recessed portions 46a are formed on an outer peripheral edge of the drive ring 46 in the circumferential direction. Connecting pins 52a disposed on first end sides of the lever plates 52 are engaged with the recessed portions 46a. The second end sides of the lever plates 52 are coupled to the nozzle shafts 44a of the nozzle vanes 44. A plurality of lever plates 52 are disposed along the circumferential direction of the drive ring 46, and the number of lever plates 52 is the same as the number of the nozzle vanes 44.

In the above configuration, exhaust gas discharged from the internal combustion engine is introduced into the scroll 22 of the turbine part 12, to reach the position of the nozzle vanes 44 of the variable nozzle mechanism 20 while flowing in rotation along the spiral shape of the scroll 22. Further, the exhaust gas rotates the turbine rotor 24 while passing through between the nozzle vanes 44, and is discharged outside from an exhaust-gas outlet 28.

Furthermore, in the compressor part 14, the compressor 32 rotates via the turbine shaft 26 along with rotation of the turbine rotor 24. Along with rotation of the compressor 32, supply air is introduced into the compressor housing 18 from the supply-air inlet 34. The introduced supply air is supplied (supercharged) to a supply port (not depicted) of the internal combustion engine while being compressed in the supply passage 30.

The variable nozzle mechanism 20 drives the actuator 48 to rotate the drive ring 46, revolving each lever plate 52 and adjusting the vane angle of each nozzle vane 44. Accordingly, the area of an exhaust gas flow path between the nozzle vanes 44 is adjusted, and the volume of exhaust gas that reaches the turbine rotor 24 is controlled.

In the exemplary embodiment, a recessed portion 46b to be engaged with a link 50 connected to an operating portion of the actuator 48 is formed on the outer peripheral edge of the drive ring 46. Furthermore, a cutout 46c for letting through a flange portion 54b of the support pin 54 described below is formed on the outer peripheral edge of the drive ring 46.

In an exemplary embodiment, as depicted in FIG. 2, the support pin 54 is fixed to the side of the drive ring 46 of the nozzle mount 42. The support pin 54 includes a support column portion 54a extending along the center axis of the drive ring 46 from the nozzle mount 42 toward the drive ring 46, and a flange portion 54b disposed on the tip side of the support column portion 54a.

The drive ring 46 can pass through the support pin 54 at the cutout 46c. After the drive ring 46 passes through the support pin 54, the drive ring 46 is rotated in the circumferential direction, and thereby the inner peripheral edge of the drive ring 46 engages with the support pin 54, thereby restricting the position of the drive ring 46 in the direction of the axial center C.

Figure 3:
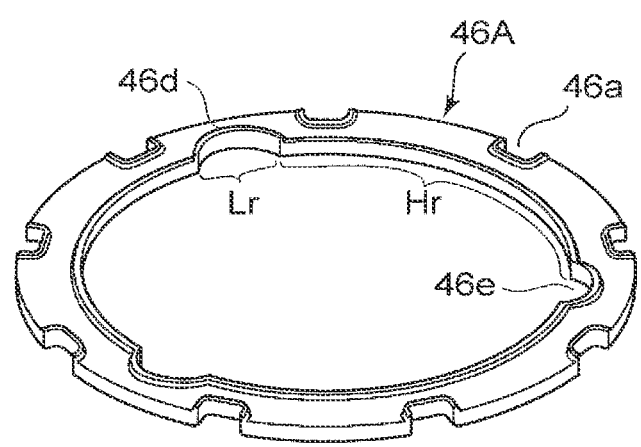
FIG. 3 is a perspective view of a drive ring according to an embodiment.
Figure 4:
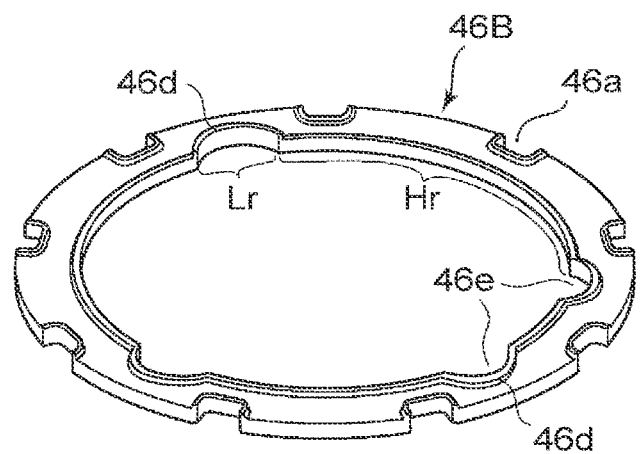
FIG. 4 is a perspective view of a drive ring according to an embodiment.
Figure 5:
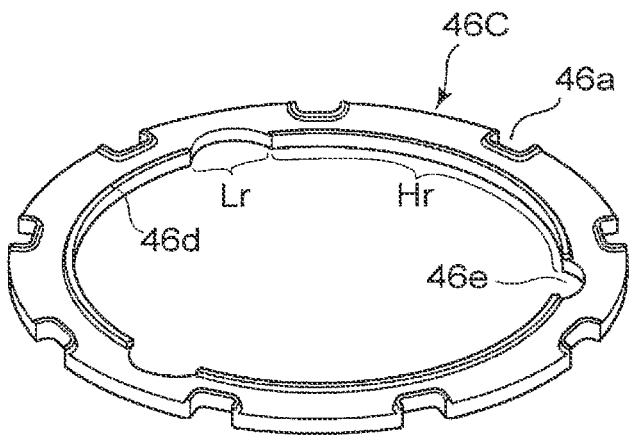
FIG. 5 is a perspective view of a drive ring according to an embodiment.

The drive ring 46 includes, as depicted in FIGS. 3 to 5 for instance, a low-rigidity region Lr and a high-rigidity region Hr. The high-rigidity region Hr has an uneven portion in the thickness direction of the drive ring 46, and the cross-sectional secondary moment of the high-rigidity region Hr in a cross section along the radial direction of the drive ring 46 is greater than that of the low-rigidity region Lr. The low-rigidity region Lr and the high-rigidity region Hr are disposed alternately in the circumferential direction of the drive ring 46. An odd number of low-rigidity regions Lr and high-rigidity regions Hr are provided, or the low-rigidity regions Lr and the high-rigidity regions Hr are arranged in the circumferential direction at an irregular pitch.

In an exemplary embodiment, like the drive rings 46A and 46C shown in FIGS. 3 to 5 for instance, the high-rigidity region Hr is provided with a rib 46d extending along the circumferential direction of the inner peripheral region (inner peripheral edge) of the drive ring 46, and the rib 46d forms an uneven portion in the thickness direction of the drive ring 46. The rib 46d may extend along the circumferential direction on the outer peripheral region (e.g. outer peripheral edge) of the drive ring 46.

Figure 6:
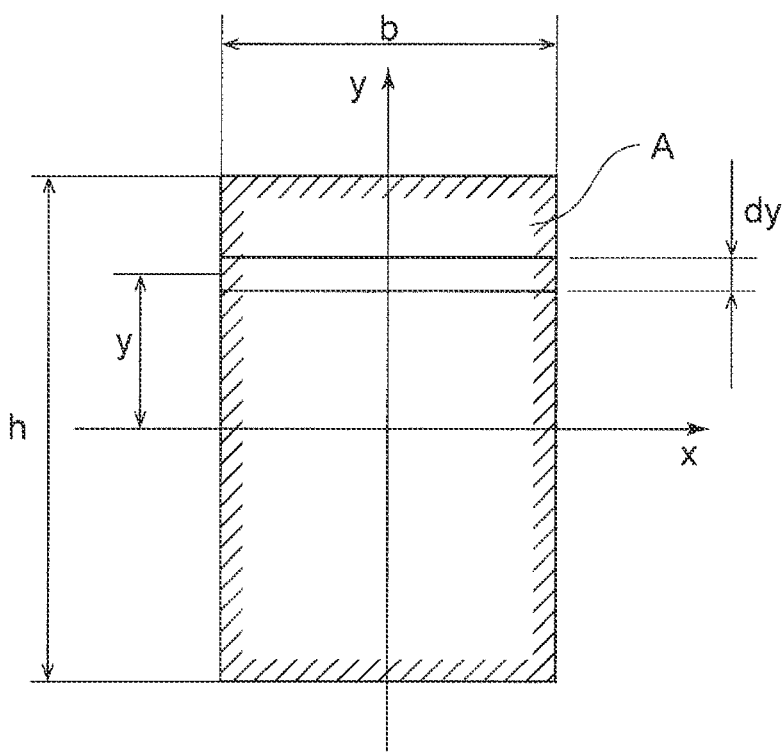
FIG. 6 is a schematic diagram of a block-shaped member for calculating a cross-sectional secondary moment.

The cross-sectional secondary moment related to x-axis of the block-shaped member A schematically shown in FIG. 6 can be obtained from the following expression (a).

(Expression 1)

$$I_x = \int_{-\frac{h}{2}}^{\frac{h}{2}} y^2 b \, dy = \left[\frac{1}{3} b y^3\right]_{-\frac{h}{2}}^{\frac{h}{2}} = \frac{bh^3}{12} \quad (a)$$

From the expression (a), the increase rate of the cross-sectional secondary moment of the block-shaped member A increases much more sensitively to an increase in the thickness directional dimension h than to an increase in the width directional dimension b.

Accordingly, with the rib 46d formed in the thickness direction of the drive ring 46, it is possible to increase the increase rate of the cross-sectional secondary moment.

FIGS. 7A to 7G show cross-sectional shapes of the drive ring 46 in the radial direction, with the shape of an uneven portion formed by bending the drive ring, according to some embodiments.

Figure 7A:
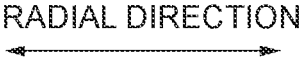
FIGS. 7A to 7G are each a cross-sectional view of a drive ring according to some embodiments, taken along the radial direction.

In FIG. 7A, a projecting portion is formed along the radial direction, on the inner peripheral edge of the drive ring 46.

Figure 7B:
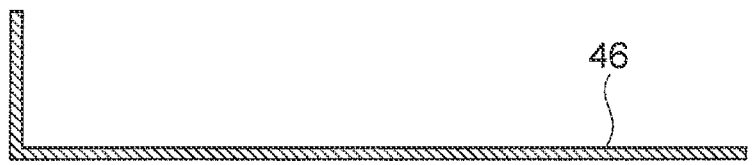

In FIG. 7B, a projecting portion is formed along the radial direction, on the outer peripheral edge of the drive ring.

Figure 7C:

In FIG. 7C, the radial-directional inner peripheral region of the drive ring is an inclined surface.

Figure 7D:
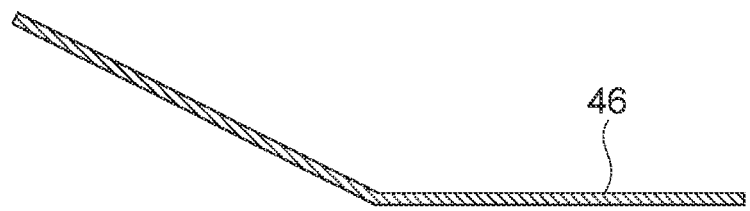

In FIG. 7D, a recessed portion having a reversed trapezoidal cross-sectionals shape is formed in the center region in the radial direction of the drive ring.

Figure 7E:
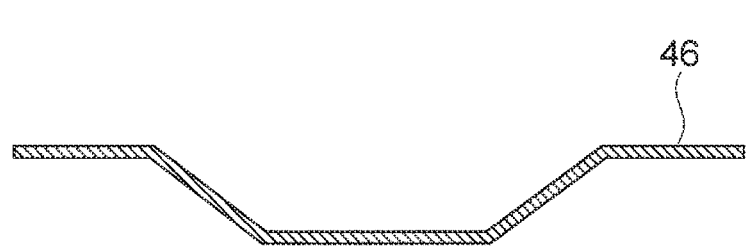

In FIG. 7E, the radial directional cross section of the drive ring is formed into an arc shape, and the center portion is dented.

Figure 7F:

In FIG. 7F, a projecting portion is formed along the radial direction, on the inner peripheral edge and the outer peripheral edge of the drive ring.

Figure 7G:
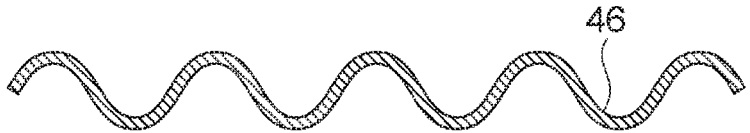

In FIG. 7G, the radial directional cross section of the drive ring is formed into a wavy shape.

The above uneven shapes can increase the thickness directional dimension of the drive ring. With such an uneven portion formed on the drive ring 46, it is possible to form the high-rigidity region Hr.

Figure 8:
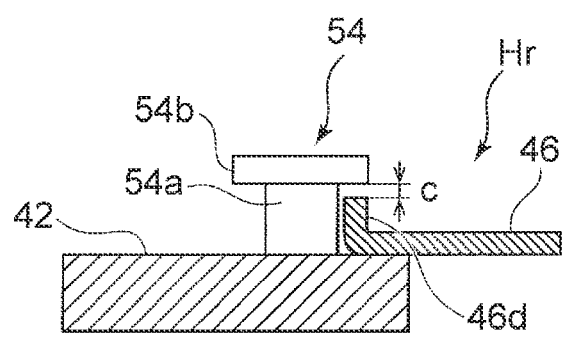
FIG. 8 is a cross-sectional view of a variable nozzle mechanism according to an embodiment.

As depicted in FIG. 8, in some embodiments, the drive ring 46 is disposed so that the uneven portion (e.g. rib 46d) is nipped between the flange portion 54b and the nozzle mount 42. Accordingly, the clearance between the uneven portion and the flange portion 54b or the nozzle mount 42 is reduced, and thereby collision oscillation that occurs when the uneven portion hits the flange portion 54b or the nozzle mount 42 is suppressed.

In an exemplary configuration, the uneven portion is disposed selectively in the high-rigidity region Hr of the drive ring. FIG. 8 shows an embodiment of such a configuration. A rib 46d is formed in the thickness direction along the circumferential direction of the drive ring 46 in the inner peripheral region (e.g. inner peripheral edge) of the drive ring 46B. With an uneven portion in the thickness direction formed selectively in the high-rigidity region Hr, it is possible to form the high-rigidity region Hr easily.

Furthermore, in an exemplary embodiment, as depicted in FIG. 3, an uneven portion (e.g. rib 46d) is formed over the entire periphery of the drive ring 46A. The low-rigidity region Lr has an odd number of small-width regions 46e (three in the drawing) formed therein, having a smaller width in the radial direction than the high-rigidity region Hr.

Accordingly, an odd number of high-rigidity regions Hr and an odd number of low-rigidity regions Lr are formed in the circumferential direction of the drive ring 46A.

As depicted in FIG. 4, the small-width region 46e may be formed at an irregular pitch in the circumferential direction of the drive ring 46B. Accordingly, the high-rigidity regions Hr and the low-rigidity regions Lr are formed in the circumferential direction at an irregular pitch. In a case where the small-width regions 46e are formed at an irregular pitch as described above, the number of small-width regions 46e may be an even number.

Further, when the rib 46d is shaped by bending, the small-width region 46e may be formed as an undercut. With the small-width region 46e formed as an undercut, the rib 46d can be bended easily.

On the drive ring 46C according to an embodiment depicted in FIG. 5, the rib 46d is formed in the circumferential direction on the inner peripheral region of the drive ring 46, but the rib 46d is not formed in the small-width region 46e where the width in the radial direction is reduced. In other words, the small-width regions 46e are formed as undercuts. Formation of the undercuts makes it easier to bend the rib 46d.

In some embodiments, an odd number of high-rigidity regions Hr and low-rigidity regions Lr are provided in the circumferential direction of the drive ring 46, or high-rigidity regions Hr and low-rigidity regions Lr are provided at an irregular pitch, and thereby it is possible to suppress excitation of natural oscillation in the primary oscillation mode in which an even number of nodes and anti-nodes are formed regularly. Accordingly, it is possible to suppress generation of stress and to prevent damage to the drive ring. Further, the high-rigidity regions Hr having a large cross-sectional secondary moment are formed and the rigidity of the drive ring is enhanced as a whole, and thus it is possible to further suppress generation of natural oscillation.

Further, it is possible to suppress generation of stress without taking into consideration the positional relationship between the support pins and the nodes formed in the primary oscillation mode, unlike Patent Document 2. Furthermore, it is possible to suppress generation of stress, and thereby it is possible to reduce the thickness of the drive ring and to reduce the costs.

Furthermore, in some embodiments, as depicted in FIGS. 3 to 5 for instance, the high-rigidity region Hr includes the rib 46d extending along the circumferential direction of the drive ring 46A or 46C, and the rib 46d forms an uneven portion in the thickness direction of the drive ring, which makes it possible to form the high-rigidity region Hr by simple and low-cost machining. Furthermore, it is possible to increase the thickness directional dimension with the uneven portion, and to increase the cross-sectional secondary moment considerably compared to an increase in the radial directional dimension, which makes it possible to increase the rigidity of the high-rigidity region Hr effectively.

Furthermore, in some embodiments, like the drive ring 46 depicted in FIG. 8, the uneven portion (e.g. rib 46d) is disposed so as to be nipped between the flange portion 54b and the nozzle mount 42, which makes it possible to reduce the clearance c between the uneven portion and the flange portion 54b. Accordingly, it is possible to reduce collision oscillation that occurs at the uneven portion, and to suppress generation of stress at the uneven portion.

Furthermore, the uneven portion is disposed selectively in the high-rigidity region Hr, and thus it is possible to increase the cross-sectional secondary moment of the high-rigidity region Hr effectively.

Furthermore, in some embodiments, as depicted in FIGS. 3 and 4, the rib 46d is formed over the entire periphery of the drive ring 46A as the high-rigidity region Hr, and an odd number of small-width regions 46e are formed in the circumferential direction or the small-width regions 46e are formed at an irregular pitch as the low-rigidity region Lr, and thus it is possible to form the high-rigidity regions Hr and the low-rigidity regions Lr easily by simple and low-cost machining.

Furthermore, according to at least one embodiment, undercuts are formed as the low-rigidity region Lr like the drive ring 46C depicted in FIG. 5, and thus it is possible to bend the rib 46d easily.

Figure 9:
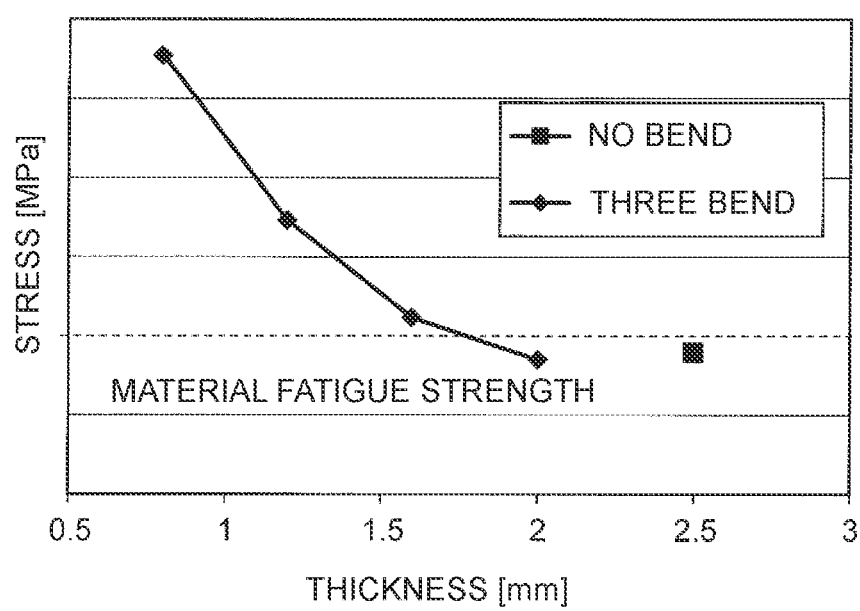
FIG. 9 is a diagram showing stress generation of the drive ring depicted in FIG. 5.

FIG. 9 is a diagram of calculation results of stress generated in the drive ring 46C with three undercuts formed on the inner peripheral edge in the circumferential direction of the drive ring 46, and of a typical drive ring. FIG. 9 shows that an increase in the stress generation can be still suppressed substantially similarly even if the thickness of the drive ring 46C is smaller than that of a typical drive ring.

Further, in some embodiments, as depicted in FIG. 1, the variable-displacement type exhaust turbocharger 10 includes the variable nozzle mechanism 20, and is capable of suppressing oscillation of the drive ring 46. Accordingly, it is possible to suppress generation of stress, and to prevent damage to the drive ring 46.

Further, it is possible to suppress generation of stress without taking into consideration the positional relationship between the support pins and the nodes formed in the primary oscillation mode. Furthermore, it is possible to suppress generation of stress, and thereby it is possible to reduce the thickness of the drive ring 46 and to reduce the costs.

In the above embodiment, the drive ring 46A shown in FIG. 3 may not include a small-width region 46e formed thereon, and the low-rigidity region Lr can be formed merely by not providing the rib 46d.

Figure 10:
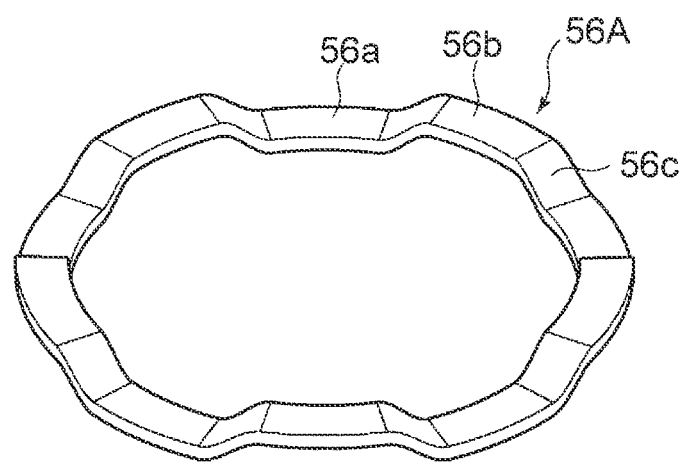
FIG. 10 is a perspective view of a drive ring according to an embodiment.
Figure 11:
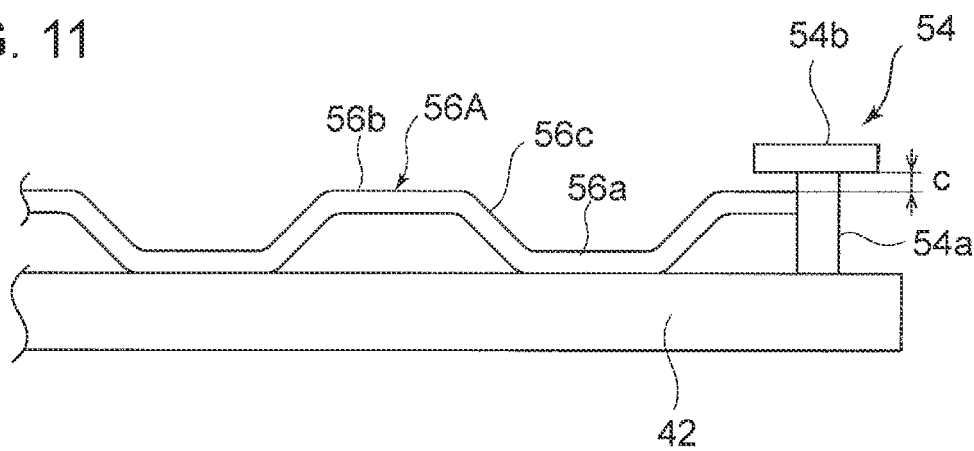
FIG. 11 is a side view of the drive ring depicted in FIG. 10.

As depicted in FIGS. 10 and 11, the drive ring 56A according to at least one embodiment includes bottom portions 56a disposed at a distance from one another in the circumferential direction, and a plurality of top portions 56b each disposed between adjacent two of the bottom portions 56a in the circumferential direction, the top portions 56b having a greater distance from the nozzle mount 42 than the bottom portions 56a in the direction along the center axis of the drive ring. The bottom portions 56a and the top portions 56b are arranged alternately in the circumferential direction.

In an exemplary configuration, a stepped portion 56c is formed between a bottom portion 56a and a top portion 56b. The drive ring 56A is provided with an odd number (e.g. five as depicted in FIG. 10) of such stepped portions 56c formed in the circumferential direction.

Figure 12:
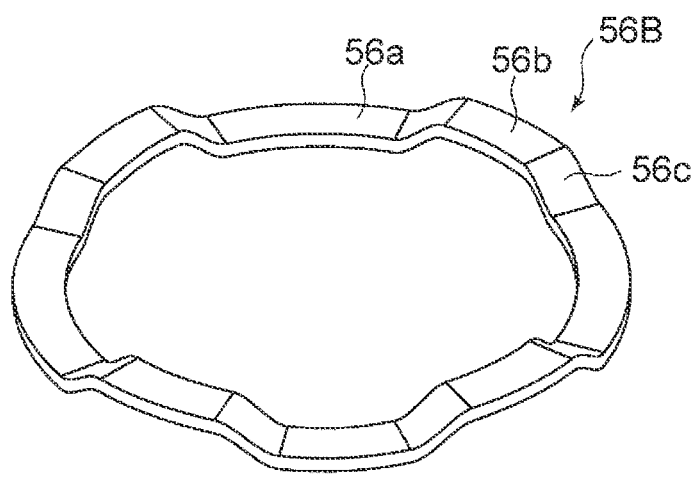
FIG. 12 is a perspective view of a drive ring according to an embodiment.

Like the drive ring 56B depicted in FIG. 12, the stepped portions 56c may be formed at an irregular pitch in the circumferential direction of the drive ring 56A. As described above, if the stepped portions 56c are provided at an irregular interval, the number of the stepped portions 56c may be an even number (four in the drive ring 56B).

Furthermore, as depicted in FIG. 11, further provided is the support pin 54 fixed to the nozzle mount 42, supporting the drive ring 56 rotatably on the nozzle mount 42. The support pin 54 has the support column portion 54a and the flange portion 54b.

On the drive ring 56, the top portion 56b is disposed between the flange portion 54b and the nozzle mount 42 so as to be adjacent to the flange portion 54b, and a minute clearance c is formed between the top portion 56b and the flange portion 54b.

Figure 13A:
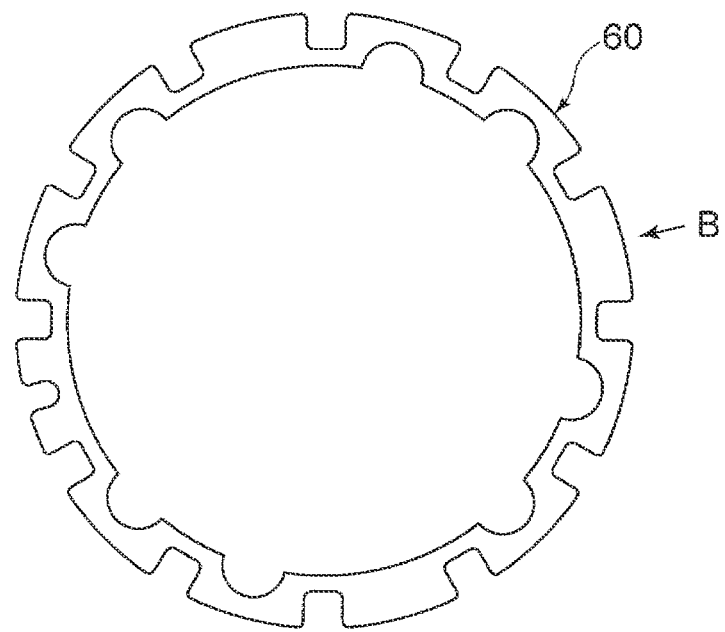
FIG. 13A is a front view of the drive ring according to an embodiment.
Figure 13B:
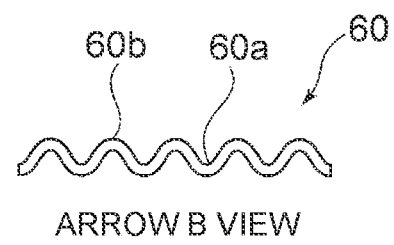
FIG. 13B is a view of the drive ring as seen in the direction B in FIG. 13A.
Figure 15:
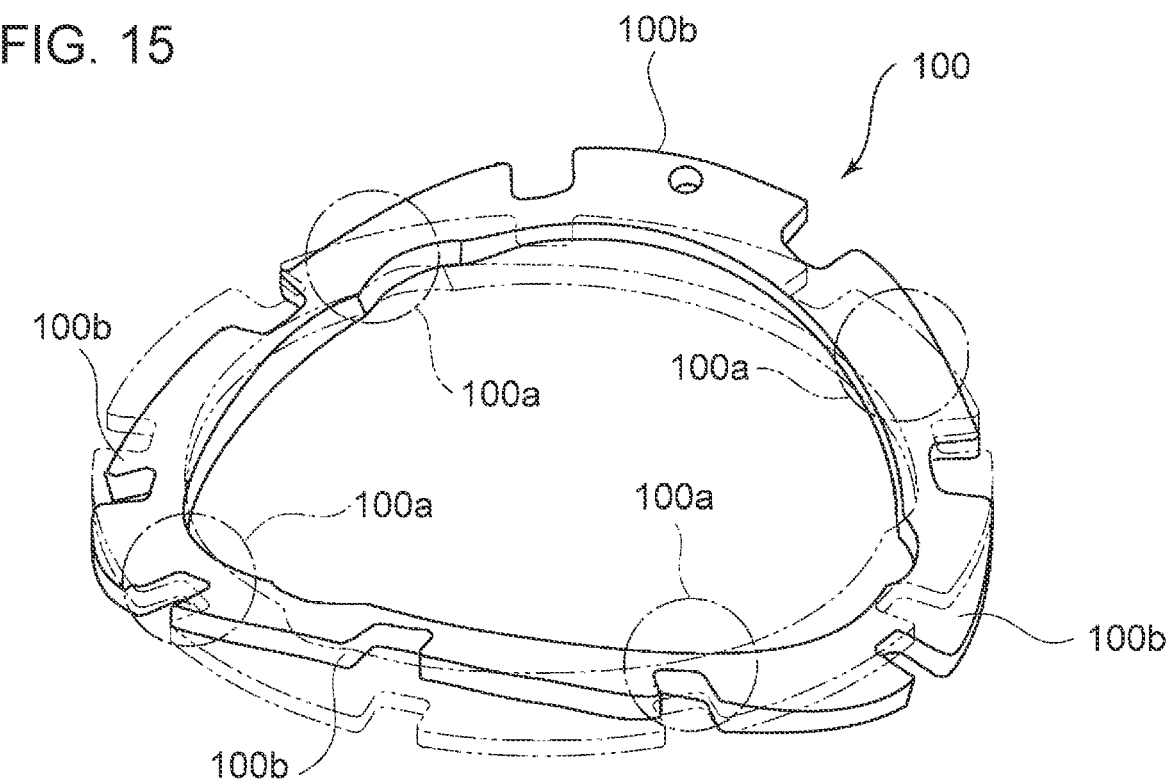
FIG. 15 is an analysis diagram of the primary oscillation mode of the drive ring.

In the drive ring 60 according to at least one embodiment, as depicted in FIG. 13, the bottom portions 60a and the top portions 60b are formed alternately to form a wavy shape. The wavy shape made up by the bottom portions 60a and the top portions 60b are disposed substantially over the entire periphery of the drive ring 60.

In the embodiment depicted in FIGS. 10 and 11, the bottom portions 56a and the top portions 56b are disposed alternately in the circumferential direction of the drive ring 56, and thus the drive ring 56 can have a high rigidity in the circumferential direction as a whole. Thus, it is possible to suppress excitation of natural oscillation in the primary oscillation mode of the drive ring 56, and to suppress generation of stress, which makes it possible to prevent damage to the drive ring 56.

Further, it is possible to suppress generation of stress without taking into consideration the positional relationship between the support column portions 54a and the nodes formed in the primary oscillation mode. Furthermore, it is possible to suppress generation of stress, and thereby it is possible to reduce the thickness of the drive ring and to reduce the costs.

Furthermore, an odd number of stepped portions 56c is formed in the circumferential direction of the drive ring 56A, or the stepped portions 56c are provided in the circumferential direction of the drive ring 56B at an irregular pitch, and thereby it is possible to form anti-nodes at different positions from the positions of the four anti-nodes formed regularly in the primary oscillation mode. Accordingly, it is possible to suppress excitation of natural oscillation in the primary oscillation mode, and to suppress generation of stress.

Furthermore, the top portions 56b are disposed between the flange portion 54b and the nozzle mount 42 so as to be adjacent to the flange portions 54b, whereby the clearance c between the top portions 56b and the support pins 54 can be reduced. Thus, it is possible to suppress stress generated in the top portions 56b due to collision oscillation between the top portions 56b and the support pins 54.

Furthermore, in the embodiment depicted in FIG. 13, the bottom portions 60a and the top portions 60b are formed alternately so as to form a wavy shape in the circumferential direction of the drive ring 60, and the wavy shape is disposed substantially over the entire periphery of the drive ring 60. Thus, it is possible to form the high-rigidity regions Hr by simple and low-cost machining.

Accordingly, the drive ring 60 can have a high rigidity as a whole in the circumferential direction, and thus it is possible to suppress excitation of natural oscillation in the primary oscillation mode of the drive ring 60. Accordingly, it is possible to suppress generation of stress and to prevent damage to the drive ring 60.

INDUSTRIAL APPLICABILITY

According to at least one embodiment of the present invention, it is possible to suppress oscillation of the drive ring regardless of the positional relationship between the support pin and the nodes formed in the primary oscillation mode. Accordingly, it is possible to suppress generation of stress and to prevent damage to the drive ring.

DESCRIPTION OF REFERENCE NUMERALS

10 Variable-displacement type exhaust turbocharger
12 Turbine part
14 Compressor part
16 Turbine housing
18 Compressor housing
20 Variable nozzle mechanism
22 Scroll
24 Turbine rotor
26 Turbine shaft
28 Exhaust-gas outlet
30 Supply passage
32 Compressor
34 Supply-air inlet
36 Bearing housing
38 Bearing
42 Nozzle mount
44 Nozzle vane
44a Nozzle shaft
46, 46A, 46B, 46C, 56A, 56B, 60, 100 Drive ring
46a, 46b Recessed portion
46c Cutout
46d Rib
46e Small-width region (undercut)
56a, 60a Bottom portion
56b, 60b Top portion
56c Stepped portion
100a Node
100b Anti-node
48 Actuator
50 Link
52 Lever plate
52a Connecting pin
54 Support pin
54a Support column portion
54b Flange portion
A Block-shaped member
C Axial center
Hr High-rigidity region
Lr Low-rigidity region
c clearance

The invention claimed is:
1. A variable nozzle mechanism, comprising:
a nozzle mount having an annular shape;
a plurality of nozzle vanes supported rotatably at a plurality of respective locations along a circumferential direction of the nozzle mount; and a drive ring disposed rotatably with respect to the nozzle mount, the drive ring being configured to transmit a driving force to the nozzle vanes so that a vane angle of the nozzle vanes is variable and to rotate the nozzle vanes, the drive ring having a plurality of recessed portions with which a lever plate for transmitting the driving force to the nozzle vanes are engaged, wherein the drive ring includes:

a plurality of lower-rigidity regions; and a plurality of higher-rigidity regions including an uneven portion in a thickness direction of the drive ring, and having a greater cross-sectional secondary moment than the plurality of lower-rigidity regions in a radial cross section and about a radial direction of the drive ring, wherein each of the plurality of lower-rigidity regions includes an undercut which is different from the plurality of recessed portions, wherein each of the plurality of lower-rigidity regions and each of the plurality of higher-rigidity regions are disposed alternately in the circumferential direction, wherein the number of the plurality of lower-rigidity regions and the number of the plurality of higher-rigidity regions are odd numbers, or the plurality of lower-rigidity regions and the plurality of higher-rigidity regions are disposed at an irregular pitch in the circumferential direction, wherein the uneven portion of the plurality of higher-rigidity regions is formed by a rib extending along the circumferential direction at an inner peripheral side of the drive ring, and wherein the rib forming the uneven portion is disposed selectively in the plurality of higher-rigidity regions.

2. The variable nozzle mechanism according to claim 1, further comprising a support pin fixed to the nozzle mount, the support pin supporting the drive ring rotatably on the nozzle mount, wherein the support pin includes:

a support column portion extending parallel to a center axis of the drive ring from the nozzle mount toward the drive ring; and a flange portion disposed on a tip side of the support column portion, and wherein the drive ring is disposed so that the uneven portion is nipped between the flange portion and the nozzle mount.

3. A variable-geometry type exhaust turbocharger, comprising:

a turbine part configured to be driven by exhaust gas introduced from an internal combustion engine;

a compressor part configured to compress and send external air to the internal combustion engine along with the turbine part; and a variable nozzle mechanism disposed in a turbine housing into which the exhaust gas is introduced at the turbine part, wherein the variable nozzle mechanism includes, a nozzle mount having an annular shape;

a plurality of nozzle vanes supported rotatably at a plurality of respective locations along a circumferential direction of the nozzle mount; and a drive ring disposed rotatably with respect to the nozzle mount, the drive ring being configured to transmit a driving force to the nozzle vanes so that a vane angle of the nozzle vanes is variable and to rotate the nozzle vanes, the drive ring having a plurality of recessed portions with which a lever plate for transmitting the driving force to the nozzle vanes are engaged, wherein the drive ring includes:

a plurality of lower-rigidity regions; and a plurality of higher-rigidity regions including an uneven portion in a thickness direction of the drive ring, and having a greater cross-sectional secondary moment than the plurality of lower-rigidity regions in a radial cross section and about a radial direction of the drive ring, wherein each of the plurality of lower-rigidity regions includes an undercut which is different from the plurality of recessed portions, wherein each of the plurality of lower-rigidity regions and each of the plurality of higher-rigidity regions are disposed alternately in the circumferential direction, wherein the number of the plurality of lower-rigidity regions and the number of the plurality of higher-rigidity regions are odd numbers, or the plurality of lower-rigidity regions and the plurality of higher-rigidity regions are disposed at an irregular pitch in the circumferential direction, wherein the uneven portion of the plurality of higher-rigidity regions is formed by a rib extending along the circumferential direction at an inner peripheral side of the drive ring, and wherein the rib forming the uneven portion is disposed selectively in the plurality of higher-rigidity regions.

* * * * *